United States Patent [19]
Takeuchi et al.

[11] 3,999,006
[45] Dec. 21, 1976

[54] VISITOR CONFIRMATION SYSTEM

[75] Inventors: Takeshi Takeuchi; Yukio Manabe, both of Yokohama, Japan

[73] Assignee: Hochiki Corporation, Tokyo, Japan

[22] Filed: Oct. 21, 1974

[21] Appl. No.: 516,700

[30] Foreign Application Priority Data
Oct. 24, 1973  Japan .................... 48-118893

[52] U.S. Cl. .................. 358/85; 325/308; 178/DIG. 13; 178/DIG. 38; 179/2 TV
[51] Int. Cl.² ........................... H04N 7/02
[58] Field of Search ........ 325/31, 308; 178/5.6, 178/6, DIG. 1, DIG. 13, DIG. 38; 179/2 TV, 1 B

[56] References Cited
UNITED STATES PATENTS

| | | | |
|---|---|---|---|
| 3,519,744 | 7/1970 | Dorros et al. | 179/2 TV |
| 3,649,761 | 3/1972 | Bush et al. | 179/2 TV |
| 3,742,133 | 6/1973 | O'Sullivan | 178/DIG. 13 |
| 3,746,780 | 7/1973 | Stetten et al. | 178/DIG. 13 |
| 3,816,662 | 6/1974 | Shaver et al. | 179/2 TV |

*Primary Examiner*—Robert L. Griffin
*Assistant Examiner*—Jin F. Ng
*Attorney, Agent, or Firm*—Frank J. Jordan

[57] ABSTRACT

A visitor comfirmation system utilized with a CATV or MATV system and a telephone system enables a caller to call a subscriber on a call-up telephone while simultaneously having the subscriber's image transmitted by a television camera to a monitoring television in the subscriber's premises. Means are provided to transmit the visitors image to the subscriber monitor television even though the subscriber may be using the telephone when the visitor calls on the call-up telephone.

7 Claims, 6 Drawing Figures

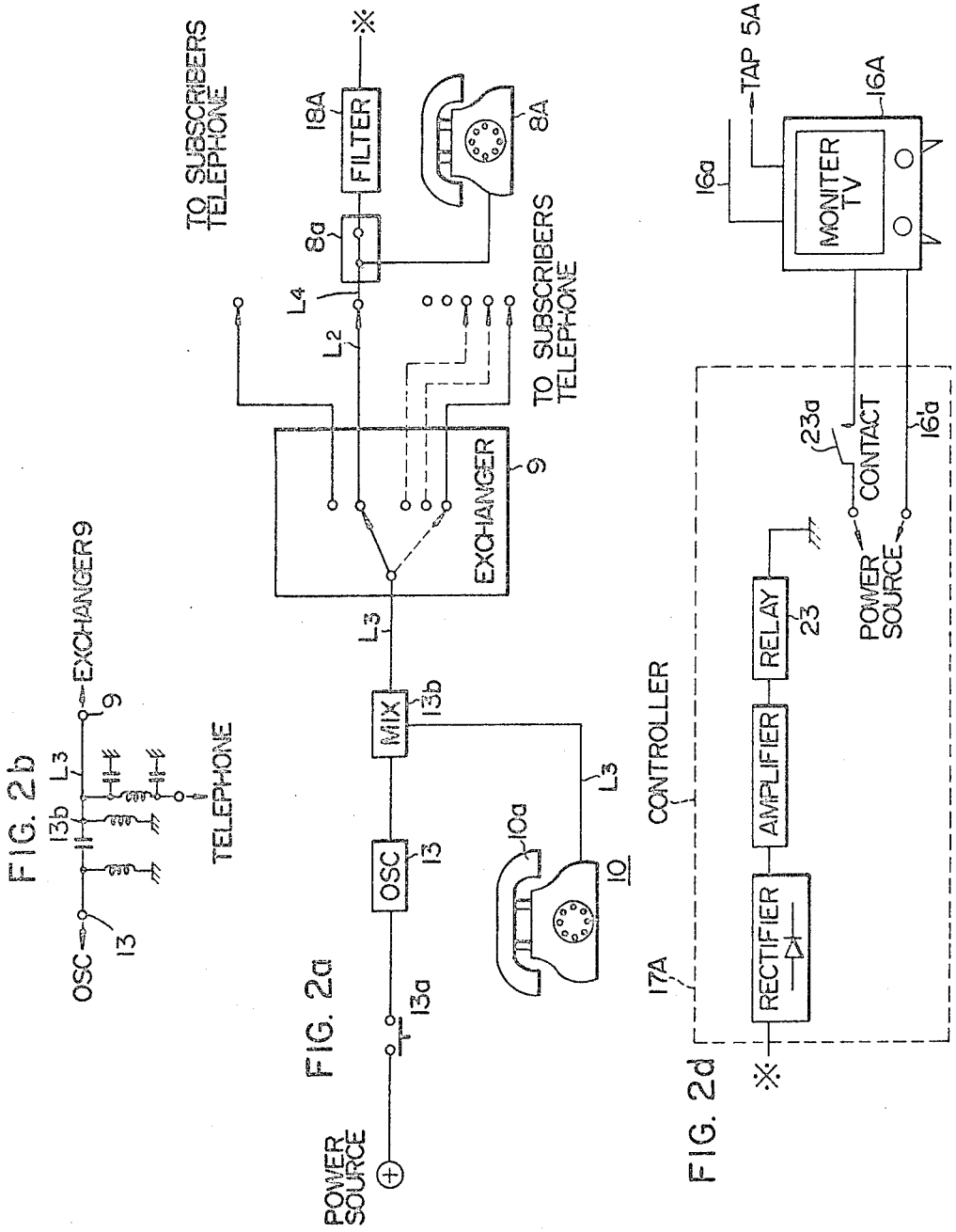

VISITOR CONFIRMATION SYSTEM

BACKGROUND OF THE INVENTION

This invention relates to an internal telephone monitoring system for confirming a visitor before the visitor opens a door or otherwise enters a building. Heretofore systems of this type have not been effective enough for the scrupulous or positive confirmation of the visitor, and in cases where a large number of devices capable of utilizing the monitoring system to confirm the visitor are employed, the cost of the system therefor becomes quite expensive. Furthermore, a visitor who is not acquainted with the subscribers may have free access to the internal telephone for calling up at random, thereby resulting in another disadvantage. A visitor confirmation system would be desirable in this case for the reason that a visitor can be confirmed in a positive manner; however, none of the related systems presently available are suitable for a visitor confirmation system due to the considerably high cost thereof. It is a key point required by visitor confirmation system that such a system enable a visitor to call up any one of the subscribers constituting a single group such as a research laboratory having many offices or an apartment building where a large number of devices are installed to confirm a visitor. At the same time it is desireable to prevent other subscribers from listening to the corresponding conversation and the system showed be properly developed to make it available at low cost and be well capable of being widely used. In terms of the aforementioned point, the purpose of the present invention lies in providing such a visitor confirmation system which is adapted to be used with a conventional community television system (CATV or MATV) or telephone system installed in a unit building or in a unit area.

Although prior art internal telephone systems can be operated by making free access thereto to enable anyone to call any one of the subscribers constituting a group, whether or not a visitor is an acquaintance, it is impracticable to prevent the visitor from calling the subscriber. In case a telephone system is used for calling a subscriber no one else other than such a visitor can call the subscriber. To put it another way, such a visitor who knows at least the personal telephone number of the person to be called can call anyone in a building. Even though a visitor tries to call one of the subscribers in the building at random, the probability of ringing a telephone in the building is virtually zero, and the visitor only rings a telephone installed outside the building. Therefore, no visitor who does not know the telephone number of any of the subscribers can communicate with any other subscriber in the building, nor can he enter the building.

A method to prevent the random use of a visitor confirmation system by calling personal telephone numbers (including an intermural telephone number), for the purpose of protecting a group of subscribers constituting a unit building, or a unit area in a larger sense, as set forth above, still remain to be developed; however, such a system is highly desirable in view of the practical uses thereof.

An object of the present invention lies in providing a visitor confirmation system utilizing personal telephone numbers which is capable of preventing random calls of such a visitor who is not an acquaintance of the subscriber. Accordingly, the present invention makes use in a novel manner of a conventional community television reception system (CATV or MATV) and/or telephone system.

Another object of the present invention lies in providing a visitor confirmation system which is capable of permitting a caller to call one of the subscribers on the same circuit of a CATV or a MATV without interference to the other subscribers and/or in case a telephone system is used jointly in connection therewith, the present invention has a function of preventing other persons from listening in on the conversation on the telephone line.

Still another object of the present invention lies in providing a visitor confirmation system as set forth above and having an additional function of informing a subscriber, if the subscriber's telephone line is busy, of the presence of a visitor by reproducing an image of the visitor on the subscriber's monitoring television receiver.

SUMMARY OF THE INVENTION

In the method of operating the present invention by making use of a television community reception system (CATV or MATV) and/or a telephone system already installed in a building, a telephone for use by the caller and a television camera are properly installed at a place for a visitor to call and monitoring television receivers are installed adjacent to the telephones of respective subscribers in the building. The image signal of the visitor which is formed and generated by the television camera is properly modified in a manner as to be transmitted through an exclusive channel which is different from the channel for transmitting a telecasting signal via the CATV or MATV system. The monitoring television receiver of respective subscribers reproduce the image of the visitor by tapping off only the signal transmitted through the exclusive channel from the main telephone line through a filter which passes only the visitor's image signal transmitted through the exclusive telephone line.

A circuit which is switched on concurrently when a receiver of the telephone is picked up has a call signal generator properly installed therein. A dial signal and a call signal of the telephone are mixed and fed through a telephone switch or exchanger as an input in a proper manner, and the personal telephone of a subscriber is properly selected by the dial signal, whereby the subscriber's personal telephone is rung up. The call signal, or a part thereof, switches on a power source circuit and the image signal transmission circuit of the monitoring receiver. Thus the monitoring television receiver is put into operation. As regards to utilizing the monitoring television receiver for the subscriber, a high-frequency cycle or low-frequency cycle which is outside of the audio frequency band is specifically selected for the call signal, whereby the visitor confirmation system may be constructed in an economical manner.

Prior art telephone transmission systems utilizing the above feature have not been available. According to the present invention the call signal transmitted to a subscriber's personal telephone is properly selected through a telephone switchboard installed for its normal purpose and is capable of calling respective subscribers by employing only a single call signal. It is not required that the number of call signals correspond to the number of subscribers, and selection of only a single call signal for the system is sufficient for calling only a single subscriber and keeping other subscribers from listening in on the telephone communication, thus resulting in remarkable advantages.

DESCRIPTION OF THE DRAWINGS

FIG. 2a is a block diagram showing the call means of this system in greater detail.

FIG. 2b is a wiring diagram of a position of FIG. 2a showing schematically the mixer and signal generator.

FIG. 2d is a block diagram showing details of the controller.

DETAILED DESCRIPTION OF THE INVENTION

Figure 1:
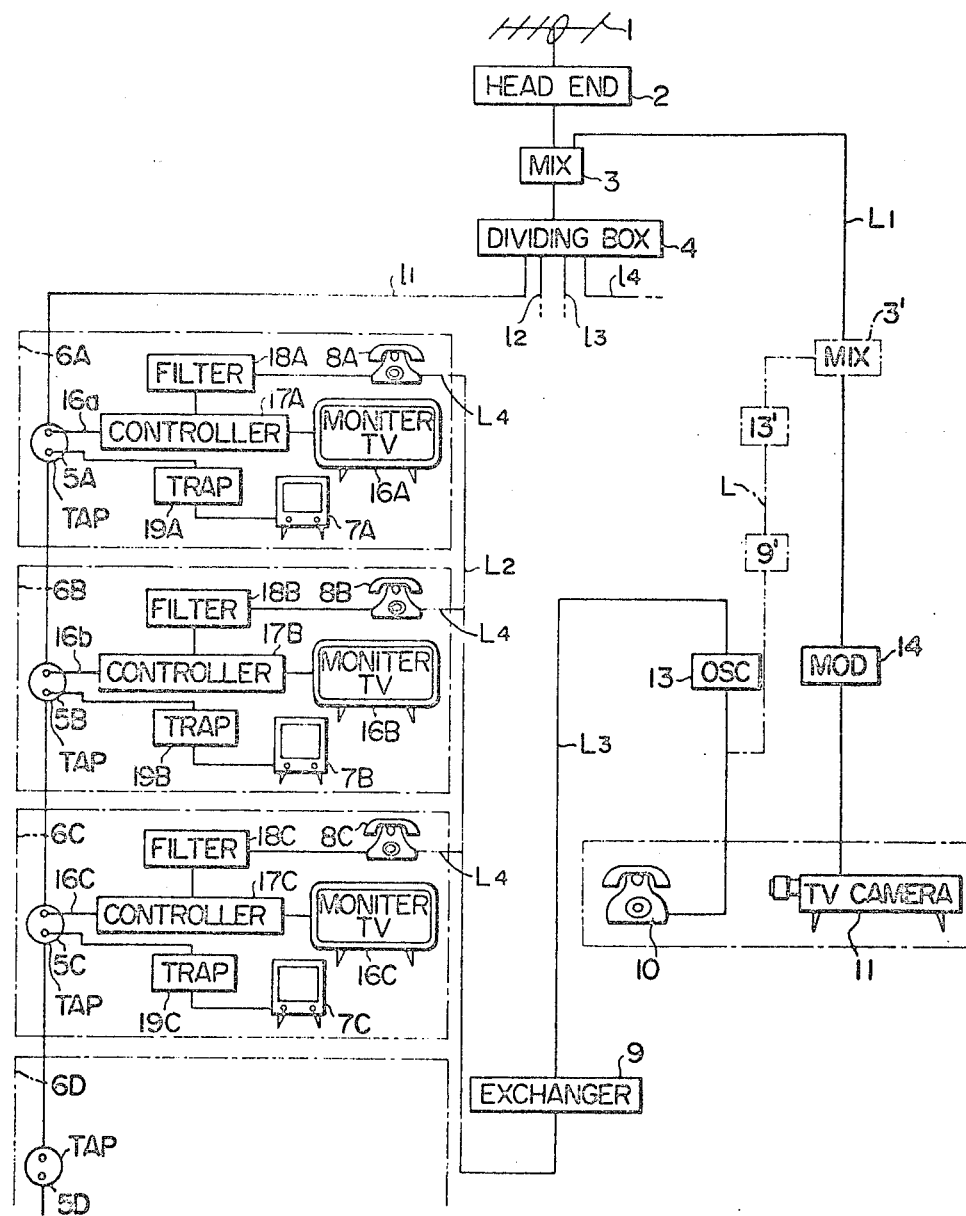
FIG. 1 is a block diagram showing a visitor confirmation system according to one embodiment of the present invention.

Referring to the drawings, a CATV or MATV system is provided with an antenna 1 for reception and a head end 2 which are in popular use in apartment houses or the like. A mixer 3 properly set in place is also provided therefor. The output side of the mixer 3 is provided with a distributor box 4, and a plurality of signal transmission lines $l_1$–$l_4$ lead from the distributor 4. Subscriber's housing units 6A–6D have the signal transmission lines $l_1$ to $l_4$ properly installed therein, respectively, in such a manner that each one of the housing units 6A–6D has at least one terminal 5A–5D for the television transmission lines. The terminals 5A–5D are connected to conventional television receivers 7A–7C, and to monitoring television receivers 16A–16C for reproducing the image of a visitor.

The monitoring television receivers 16A–16C have controllers 17A–17C properly installed therefor, respectively, in order to switch the monitoring television receivers on and off for reproducing the image of a visitor by a call signal as is set herein later. The controllers 17A–17C each have at least a relay 23 which causes respective power source circuits of the monitoring television receivers 16A–16C to be suitably switched on by the call signal in a manner as shown in FIG. 2A.

Terminals 5A-5D are provided and transmission lines between the conventional television receivers 7A–7C and the terminals 5A–5D have conventional trapping circuits 19A–19C which prevent the visitor's image signal from being transmitted to the conventional television receiver 7A–7C. Therefore the trapping circuits 19A–19C allow conventional television signals to feed into the conventional television receivers 7A–7C as an input.

Subscribers' telephones 8A–8C having dial numbers of their own, respectively, are connected with a telephone switchboard 9 through a corresponding line L4, FIG. 2a, in a multi-line cable L2. A telephone 10 for calling by a visitor is connected with the telephone switchboard 9 by a telephone transmission line L3, thereby enabling a desired one of the telephones 8A-8C to be rung up.

A television camera 11 for transmitting an image signal of a visitor to the monitoring television receivers 16A–16C is installed at the same location as that of the telephone 10 used for calling by the visitor, whereby an image of the visitor is obtained concurrently at the time the telephone 10 is used. The image signal of the visitor thus obtained is fed to the mixer 3 via a transmission line L1. The image signal is combined by mixer 3 with a television signal transmitted from the head end 2, and is then carried through the signal transmission lines $l_1$-$l_1$ of the CATV or MATV system. For the purpose of ensuring the transmission of the image signal, a modulator 14 is suitably arranged along the transmission line L1 to modulate the image signal of the visitor, thus converting the image of the visitor into a signal for a clear channel or specified channel as might otherwise adversely affect the transmission of the television signal.

A key factor in constructing a high grade system at a surprisingly low cost and providing a superb function as to have been far from being expected of any conventional visitor confirmation system thus far, and which at the same time is well capable of preventing calling-up at random, rests in the fact that the voice frequency (audio frequency) band to be transmitted through the telephone transmission line L4 covers substantially such a range as 20Hz through 30KHz. However, an audio frequency range of 20Hz through 4KHz is conventional in telephone conversations. Such a frequency signal as deviates from the aforementioned range, either to a higher level or to a lower level, is inaudible. Furthermore, such property of the telephone transmission line L4 enables the aforementioned inaudible frequency signal to be transmitted along with the abovementioned audible (voice) frequency.

The call signal generator 13, FIGS. 2a and 2b, serve to reduce the cost thereof in terms of it being coupled with a telephone system. The performance required thereof is either that the signal generator 13 produces a call signal oscillating at a frequency of below 20Hz, or a frequency of above 30KHz.

When the receiver 10a, FIG. 2a, of the call-up telephone 10 is off the hook, a switch 13a to be concurrently turned on is connected in series with the call signal generator 13. The mixer 13b connected with the telephone transmission line L3 feeds the telephone switchboard 9 with a call signal and a call-up signal after properly mixing both into a normal input. The telephone exchanger 9 makes a proper selection of one of the output lines L4 and rings a telephone 8A of the subscriber to be thus called. The mixer 13b employed for this purpose may well be of the conventional type as shown in FIGS. 2a and 2b. The output circuit L4 of the exchanger 9 has a terminal 8a for a proper arrangement of the telephone transmission line thereon, the terminal 8a being connected to the telephone 8A and to a filter 18A, FIG. 2a, which is described below. The controller 17A is connected to the output side of the filter 18A. The filter 18A to be thus employed may be a conventional LC filter.

The filter 18A serves to insure transmission of the voice frequency signals of telephone conversations to the telephone 8A, completely free of leakage of the voice frequency signals out of the line L4. In addition thereto, this filter 18A blocks the call-up signal, and also serves to cause the call signal to run thereon. The call signal having run through the filter 18A, is fed into the controller 17A, detected and amplified in a proper manner, and then puts the relay 23 in operation.

Figure 2C:
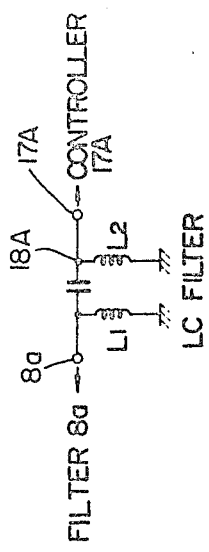
FIG. 2c is a wiring diagram of a portion of FIG. 2a showing schematically the LC filter.

In the case shown in FIGS. 2a and 2c, a call signal passes through the filter 18A and actuates the relay 23 of the controller 17A, even though the receiver of the telephone 8A of the person called up is not picked up. The abovementioned circuit may well be modified in such manner that an interlocking switch is provided for effecting a by-pass of the call signal between the filter 18A and the terminal 8a for the telephone transmission line when the receiver of the telephone 8A is picked up. In this case the call signal is not fed into the controller 17A as long as the hook is not picked up.

The most important and indispensable function of the controller 17A is to control the power source circuit 16′a of the monitoring television receiver 16A for reproducing the image of a visitor. The contact 23a arranged on the circuit 16′a is properly actuated to make contact by the action of the relay 23, and the monitoring television receiver 16A reproduces the image.

An image signal of a visitor begins to be formed and transmitted by the television camera 11 at the instance of picking up the receiver of the call-up. The image signal is properly modified into a signal in the specified frequency band by the modulator 14, and fed as an input into the mixer 3 in the CATV or MATV system. Here, the signal is transmitted to the signal transmission lines $l_1$–$l_4$ along with the run of the general television signal, and further to the respective visitor's image input circuits 16a–16c of the monitoring television receivers 16A–16C from the terminal 5A for television transmission into the respective subscriber's living quarters 6A.

Figure 3:
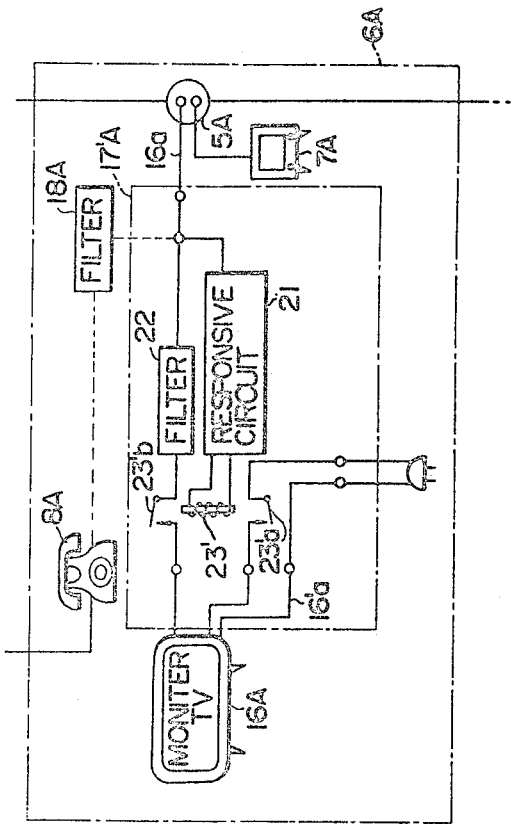
FIG. 3 is a block diagram showing a relay which turns the power on the monitoring television of respective subscribers.

FIG. 3 shows such a case as regards the conduction of the image input circuits 16a–16c. In the case of having the circuit 16a closed by such a call-up signal which is fed through the filter 18A, an additional contact 23′b is further added to the relay 23 shown in FIG. 2d. In this case, now that a call-up signal actuates relay 23′ concurrently at the time of calling the subscriber's telephone 8A, the monitoring television receivers in the living quarters of the subscribers other than the person thus called on are kept completely free from being switched on for actuating the same.

In case the powersource circuit 16′a and the input circuit 16a of the monitoring television receiver 16A are to be switched on, along with a vistor's image signal, a filter 22 and a call signal frequency response circuit 21 are properly installed in a manner as shown in FIG. 3.

The filter 22 serves only to pass a visitor's image signal and prevents a call-up signal from passing. Accordingly, a call-up signal which is properly fed to the intrinsic signal response circuit 21 which is connected with the input circuit 16a in parallel thereto, actuates the relay 23′ when the call-up signal is thus fed as an input and the intrinsic (impulse) value of this circuit 21 properly conform with each other, and thus switches on the contacts thereof 23′a and 23′b. The contact 23′a is arranged on the power source circuit 16′a and the contact 23′b is arranged on the input circuit 16a, respectively.

The call-up signal for actuating the intrinsic signal response circuit 21 is generated by a generator 13′ in an auxiliary line L as shown in FIG. 1. The registered subscriber's number which is transmitted from the telephone 10, is fed into a dial selector 9′ in line L and converted into an intrinsic signal by the intrinsic signal generator 13′. The frequency of the signal generated by the intrinsic signal generator is combined with that of the image signal by a mixer 3′ which is arranged on the visitor's image signal transmission line L1, and is transmitted through the signal transmission line L1 along with the visitor's image signal to mixer 3. In this case, now that only an intrinsic signal response circuit 21 corresponding to a signal generated by the intrinsic signal generator actuates the relay 23′, the monitoring television receivers other than the one thus actuated by the signal are kept free from being actuated.

The practical functions to be performed when the controller 17′A shown in FIG. 3 is specifically employed include those set forth below. In case the subscriber telephone is busy at the time when a visitor rings up the subscriber's telephone by the use of visitor's telephone 10, the call-up signal cannot be fed as an input into the controller in a proper manner through the normal routine of the filter 18A. Therefore, the subscriber called cannot be informed through the telephone that he/she is going to have a visitor. However, in case a call-up signal produced via the intrinsic signal generator 13′ is transmitted along with a visitor's image signal on the television transmission lines $l_1$–$l_4$, the call-up signal is fed as an input into the intrinsic signal response circuit 21, and monitoring television receiver 16A can be actuated thereby in a proper manner. A subscriber called cannot receive a call-up signal through the telephone line while he/she is on the line, but still can watch the image of a visitor reproduced on the monitoring television receiver. This function serves to provide a superb visitor confirmation system that is unique to the present invention.

The monitoring television receiver 16A is kept fed by the controller 17A with the call-up signal as an input, reproducing an image of the visitor, while the television 10 is in use. To put it otherwise, while the receiver 10 of the telephone 10 is off the hook, the call signal, generator 13 keeps generating a signal and activating a corresponding monitoring television receiver. Furthermore, since telephone call-up signal is blocked by the filter 18A, a conversation with the one on the telephone 8A is maintained in a favorable manner and completely free of leakage. An inaudible call signal passes through the filter 18A, and hence is fed into the controller 17A, virtually free from being diverted into the telephone 8A. The inaudible call signal still remains inaudible even in case the signal should be diverted into the telephone 8A. The television camera 11 can be employed and actuated in such manner either: (1) that a visitor's image is caught when he/she pushes a tread pressure switch or (2) that a visitor is detected by a photoelectric switch, prior to catching his/her image.

What is claimed is:

1. A visitor confirmation system utilized with a CATV or MATV system and with a telephone system for monitoring visitors to subscriber's premises comprising a television camera for producing a visitor's image signal, monitoring television receivers in said subscriber's premises for receiving the visitor's image signal from said television camera, conventional television receivers in said subscriber's premises, a call-up telephone for use by a visitor, telephones in said subscriber's premises, a telephone switchboard between said call-up telephone and said subscriber's telephones which combines said visitor's image signal from said television camera with the commercial television signal transmitted through said CATV or MATV sytem, call signal generator means operable to transmit a call signal at a frequency of 20 Hz or less or 30 KHz or over along with a call-up signal derived from operation of the visitor's telephone to select a corresponding subscriber's telephone, filter means operable to block telephone signals from said call up telephone of a frequency of 20 Hz through 30 KHz in the voice frequency band and to pass said call signal directly therethrough, means connecting said subscriber's telephones on the input side of said filter means, a controller connected to the output of said filter, a power source for said monitor television, said controller including a relay operated by said call signal to connect said power source to said monitor television receivers operable to prevent passage of said visitor's image signal while permitting passage of said commercial television signal to said conventional television receivers, and a telephone line wherein a call signal is transmitted concurrently with said call-up signal for selecting the corresponding subscriber's telephone to cause said power source to be connected by the operation of said controller to said subscriber's monitor television to switch on the latter, reproducing the visitor's image on said monitor television for confirmation and identification.

2. A visitor confirmation system according to claim 1 wherein said subscriber's telephone is located within view of said subscriber's monitor television, and means acting to turn on said monitor even though the subscriber is talking on the subscriber's telephone, said latter means comprising an auxiliary line connected from said visitor's telephone to said mixer and containing a call-up signal selector, an intrinsic signal generator, and an auxiliary mixer for combining said call-up signal with the image signal.

3. A visitor confirmation system according to claim 1 including a switch means connecting said call signal generator to a source of power when said call-up telephone receiver is off the hook.

4. A visitor confirmation system according to claim 3 including a mixing device for feeding said switchboard with said call-up signal and said call signal.

5. A visitor confirmation system according to claim 1 including intrinsic means connected to said filter means operable to prevent other subscribers' television monitors from being switched on when a particular monitor television is turned on.

6. A visitor confirmation system according to claim 5 wherein said intrinsic means comprises a separate circuit connected to said filter means of each monitor TV receiver and having an additional contact switch operated by said relay, and a filter in said separate circuit acting to prevent passage of a call signal while passing said visitor's image signal.

7. A visitor confirmation system according to claim 6 including actuating means for actuating said intrinsic means, said actuating means including a circuit connected between the call-up telephone and said TV camera output, comprising a dial selector, an intrinsic signal generator, and a mixer for mixing the call-up signal with said visitor's image signal.

* * * * *